US006993650B2

(12) United States Patent
Landers, Jr. et al.

(10) Patent No.: US 6,993,650 B2
(45) Date of Patent: Jan. 31, 2006

(54) AUTHENTICATIONS INTEGRATED INTO A BOOT CODE IMAGE

(75) Inventors: John David Landers, Jr., Raleigh, NC (US); Robert Eugene Russell, Jr., Cary, NC (US); David John Steiner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 10/001,697

(22) Filed: Oct. 31, 2001

(65) Prior Publication Data

US 2003/0084275 A1 May 1, 2003

(51) Int. Cl.
*G06F 9/00* (2006.01)

(52) U.S. Cl. ...................... 713/100; 713/202; 717/168; 717/171

(58) Field of Classification Search ................. 713/100
See application file for complete search history.

(56) References Cited

U.S. PATENT DOCUMENTS

| | | | | |
|---|---|---|---|---|
| 3,461,432 | A * | 8/1969 | Sichel, Jr. et al. | 341/78 |
| 5,475,762 | A | 12/1995 | Morisawa et al. | 380/25 |
| 5,892,906 | A | 4/1999 | Chou et al. | 395/188.01 |
| 6,012,146 | A | 1/2000 | Liebenow | 713/202 |
| 6,061,794 | A | 5/2000 | Angelo et al. | 713/200 |
| 6,067,625 | A | 5/2000 | Ryu | 713/202 |
| 6,199,163 | B1 | 3/2001 | Dumas et al. | 713/183 |
| 6,243,809 | B1 | 6/2001 | Gibbons et al. | 713/1 |
| 6,609,154 | B1 * | 8/2003 | Fuh et al. | 709/225 |
| 6,725,205 | B1 * | 4/2004 | Weiler et al. | 705/57 |
| 6,732,267 | B1 * | 5/2004 | Wu et al. | 713/100 |
| 6,757,825 | B1 * | 6/2004 | MacKenzie et al. | 713/169 |

FOREIGN PATENT DOCUMENTS

| | | |
|---|---|---|
| GB | 2311390 | 9/1997 |
| JP | 8147062 | 6/1996 |

OTHER PUBLICATIONS

Croucher, Phil, The BIOS Companion, 1997, ADVICE Press, p. 1.*

* cited by examiner

*Primary Examiner*—A. Elamin
*Assistant Examiner*—Anand B. Patel
(74) *Attorney, Agent, or Firm*—Robert A. Voigt, Jr.; Winstead Sechrest & Minick P.C.

(57) ABSTRACT

A method, computer program product and system for storing or updating authentications, e.g., passwords, in a boot code image, i.e., binary executable boot code, stored within a Read Only Memory (ROM), e.g., flash ROM, of a terminal from a remote central site. An authentication may be stored in the boot code image in a terminal from a central site by creating a file comprising a boot code image storing the authentication at the central site and then storing the created file in ROM in the terminal. The file may be downloaded from a server at the central site to the terminal. An authentication in the boot code image in a terminal may be updated remotely from a central site by updating the file associated with the boot code image, i.e., updating the authentication, at the central site and then downloading the updated file to the terminal.

10 Claims, 4 Drawing Sheets

AUTHENTICATIONS INTEGRATED INTO A BOOT CODE IMAGE

TECHNICAL FIELD

The present invention relates to the field of enterprise networks, and more particularly to storing and updating authentications, e.g., passwords, authentication numbers, in a boot code image, i.e., binary executable boot code, in each terminal in an enterprise network from a central site by system administrators.

BACKGROUND INFORMATION

An enterprise network may refer to a geographically dispersed network under the jurisdiction of one organization. For example, an enterprise network may comprise a main server at a central location, e.g., headquarters, coupled to a plurality of intermediate servers where each intermediate server may be located at a geographically separate location from the main server. Each intermediate server may represent a particular location, e.g., store, of an organization. Each intermediate server may then be coupled to a plurality of terminals, e.g., cash registers, personal computers, at that particular location.

Each terminal may be equipped with a BIOS (Basic Input/Output System) based password program. A BIOS based password program may run before control of the terminal is given to any disk based software. This may prevent an unauthorized user from accessing data by starting the terminal from a floppy disk or using other means to change the disk based software. Each time the terminal is activated, the BIOS based password program may issue a password prompt that appears on the monitor. If the correct password is not entered, the system will not boot. It is noted that the BIOS based password program may further request a separate password primarily for system administrators to access the setup options, e.g., BIOS setup options, of the terminal. If the correct password is not entered, access to the setup options will be denied.

Typically, passwords such as passwords to protect unauthorized users from booting the system and accessing setup options are stored in non-volatile Random Access Memory (RAM). By storing passwords in non-volatile RAM, a user at a terminal may be able to change or modify the password which may not be desirable. Users may accidentally or maliciously change the password which may result in untoward consequences such as not being able to boot up the terminal if the user cannot remember the new password. Furthermore, if the user at the terminal forgets the new password, the system administrative staff at the central site, e.g., headquarters, may have difficulty assisting the user as they may not know the new password since the user and not the system administrators at the central site changed the password. Furthermore, in an enterprise network environment, it may be difficult, cumbersome and time consuming to update passwords stored in terminals as each terminal may have different passwords from which to update which may not be known by the system administrators.

It would therefore be desirable to store authentications, e.g., password to protect unauthorized users from booting the system, password to protect unauthorized users from accessing setup options, an authentication number to permit installation of software, within a boot code image, i.e., binary executable boot code, at a terminal, e.g., cash register, personal computer, stored in Read Only Memory (ROM), e.g., flash ROM, thereby preventing the user at the terminal from tampering authentications. It would further be desirable to store or update the authentications stored in the boot code image in each terminal from a remote central site, e.g., headquarters, thereby allowing system administrators at the central site the ability to know the current authentication installed at the terminal.

SUMMARY

The problems outlined above may at least in part be solved in some embodiments by storing an authentication, e.g., password to protect unauthorized users from booting the system, password to protect unauthorized users from accessing setup options, an authentication number to permit installation of software, within a boot code image, i.e., binary executable boot code such as BIOS binary executable code, stored in Read Only Memory (ROM), e.g., flash ROM, in a terminal. By storing an authentication in the boot code image stored in ROM, a user at the terminal may be prevented from tampering with the authentication. Furthermore, the authentication in the boot code image may be stored or updated from a remote central site as described in greater detail below, thereby allowing system administrators at the central site to have knowledge of the current authentication installed at the terminal.

In one embodiment of the present invention, a method for updating authentications, e.g., passwords, authentication numbers, within a boot code image, i.e., binary executable boot code, stored in ROM, e.g., flash ROM, in a terminal from a remote central site may comprise the step of identifying a file with a boot code image comprising an authentication to be updated in one or more terminals. Each terminal may comprise a boot code image where a portion of the boot code image may be allocated for storing an authentication. Upon identifying a file with the boot code image to be updated in one or more terminals, the authentication stored in that boot code image may be updated, e.g., password may be changed. One or more terminals coupled to a server at the central site may then be identified as storing an authentication in their boot code image that needs to be updated. The authentication in the boot code image in each of the one or more terminals identified may then be updated.

In another embodiment of the present invention, a method for storing authentications, e.g., authentication number to install software, within a boot code image, i.e., binary executable boot code, in ROM, e.g., flash ROM, in a terminal from a remote central site may comprise the step of creating a file comprising a boot code image where the boot code image may comprise an authentication, e.g., authentication number to install software. The file may be created at a central site geographically separate from the location of one or more terminals to receive the file. One or more terminals coupled to the server at the central site may then be identified to store the file created. The file created may then be saved in ROM, e.g., flash ROM, in each of the one or more terminals identified. In one embodiment, the file may be downloaded from the server at the central site to each of the one or more terminals identified via a network, e.g., LAN, WAN. In another embodiment, the file may be stored on a storage medium, e.g., magnetic disk, compact disc, which may then be loaded onto the one or more terminals identified.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
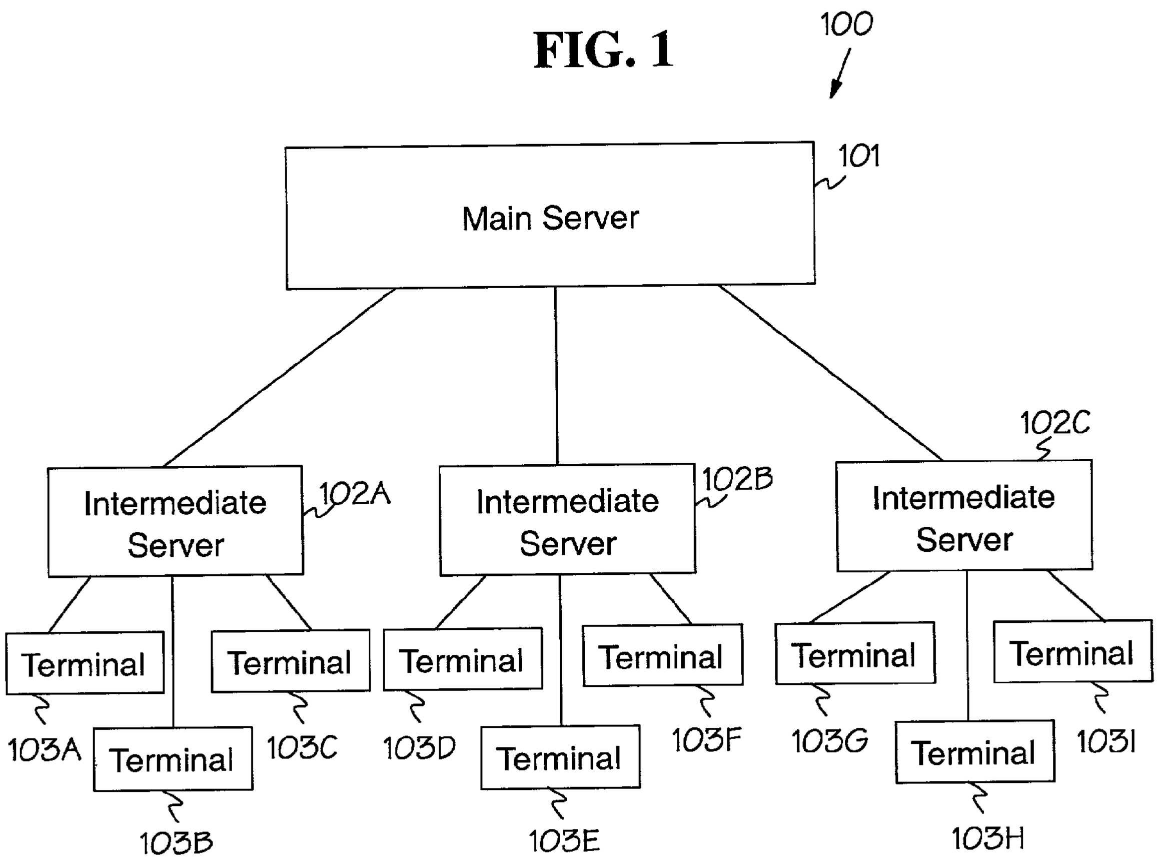
FIG. 1 illustrates an embodiment of the present invention of an enterprise network system.

FIG. 1—Enterprise System

FIG. 1 illustrates an embodiment of the present invention of an enterprise system 100. As stated in the Background Information section, an enterprise system may refer to a geographically dispersed network under the jurisdiction of one organization. Enterprise system 100 may comprise a main server 101 located at a central site, e.g., headquarters. Main server 101 may be coupled to one or more intermediate servers 102A–C located at a geographically separate location from main server 101. Intermediate servers 102A–C may collectively or individually be referred to as intermediate servers 102 or intermediate server 102, respectively. Each intermediate server 102 may be coupled to a plurality of terminals, e.g., cash registers, personal computers, at the location serviced by that intermediate server 102. For example, intermediate server 102A may be coupled to terminals 103A–C. Intermediate server 102B may be coupled to terminals 103D–F. Intermediate server 102C may be coupled to terminals 103G–I. Terminals 103A–H may collectively or individually be referred to as terminals 103 or terminal 103, respectively. It is noted that enterprise system 100 may comprise any number of main servers 101 coupled to any number of intermediate servers 102 coupled to any number of terminals 103. It is further noted that the connections between main server 101 and intermediate servers 102 and the connections between intermediate servers 102 and terminals 103 may be any medium type, e.g., wireless, wired. It is further noted that enterprise system 100 may comprise a greater or fewer number of hierarchical levels of servers than illustrated and that FIG. 1 is illustrative.

Figure 2:
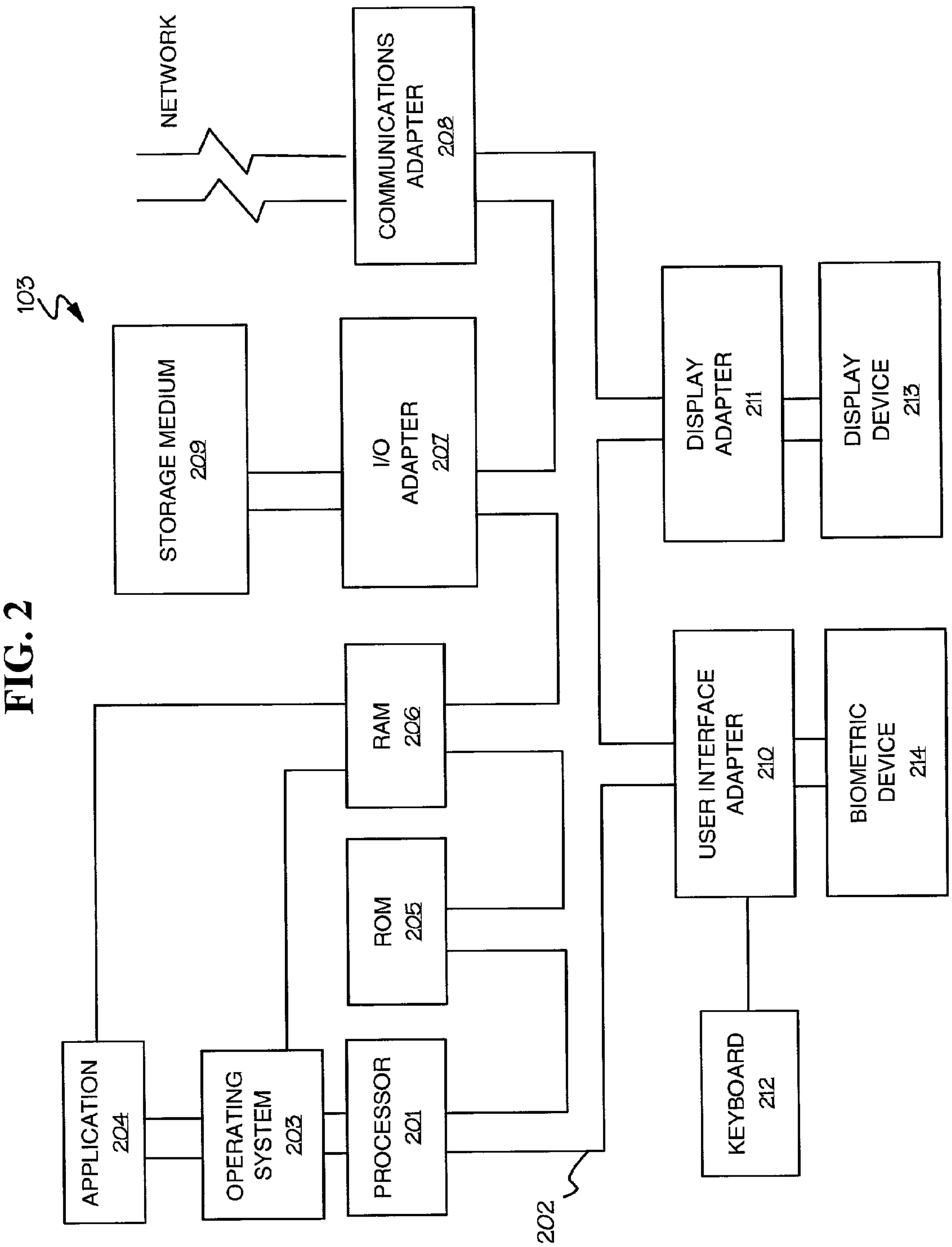
FIG. 2 illustrates an embodiment of the present invention of a terminal in an enterprise network.

FIG. 2—Hardware Configuration of Terminal

FIG. 2 illustrates an embodiment of the present invention of terminal 103. Terminal 103 may comprise a processor 201 coupled to various other components by a bus 202. An operating system 203 may run on processor 201 and provide control as well as coordinate the function of the various components of FIG. 2. Application 204 may run in conjunction with operating system 203 which implements the various functions to be performed by application 204. Terminal 103 may further comprise a read only memory (ROM) 205, e.g., flash ROM, coupled to bus 202 and may include a boot code image, i.e., binary executable boot code, that controls certain basic functions of terminal 103 as illustrated in FIG. 3.

Figure 3:
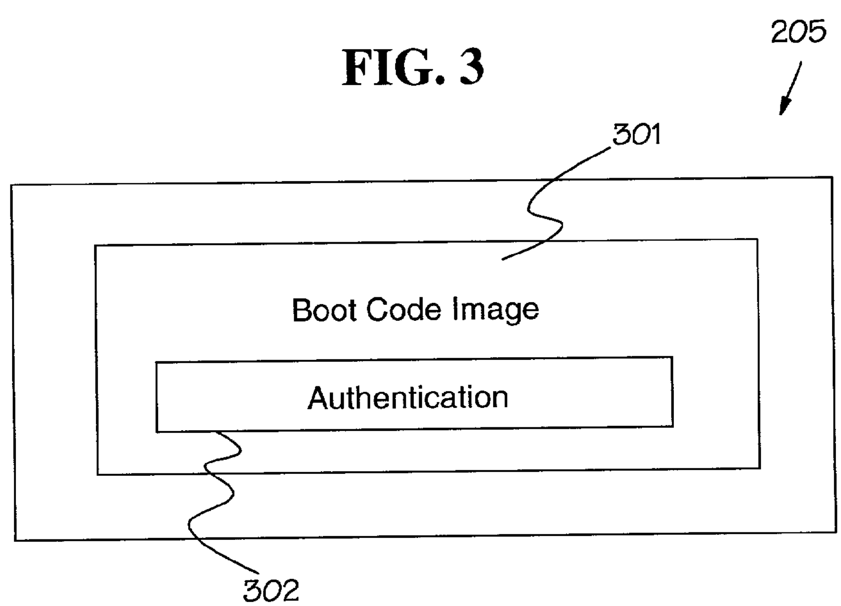
FIG. 3 illustrates an embodiment of the present invention of a memory in a terminal configured to store a boot code image comprising an authentication.

Referring to FIG. 3, FIG. 3 illustrates an embodiment of the present invention of ROM 205, e.g., flash ROM. ROM 205 may store boot code image 301, i.e., binary executable boot code such as BIOS binary executable code. A portion of boot code image 301 may be allocated for storing authentication 302, e.g., password to protect unauthorized users from booting the system, password to protect unauthorized users from accessing setup options, an authentication number to permit installation of software, an authentication to permit operation of software. In one embodiment, authentication 302 may be encrypted. Authentication 302 may be encrypted using various encryption schemes that would be recognized by a person of ordinary skill in the art and that such embodiments employing such schemes would fall within the scope of the present invention. It is noted that boot cod image 301 may be configured to store more than one authentication 302 and that FIG. 3 is illustrative.

Referring to FIG. 2, Random Access Memory (RAM) 206, Input/Output (I/O) adapter 207 and communications adapter 208 may also coupled to bus 202. It should be noted that software components including operating system 203 and application 204 may be loaded into RAM 206 which may be terminal's 103 main memory. I/O adapter 207 may be an integrated drive electronics ("IDE") adapter that communicates with a storage medium 209, e.g., disk drive. Communications adapter 208 may interconnect bus 202 with an outside network enabling terminal 103 to communicate with main server 101, intermediate server 102 via a Local Area Network (LAN), e.g., Ethernet, Token Ring, ARCnet, or a Wide Area Network (WAN), e.g., Internet.

Terminal 103 may further comprise Input/Output (I/O) devices that may be coupled to bus 202 via a user interface adapter 210 and a display adapter 211. Keyboard 212 and biometric device 214, e.g., fingerprint reader, retinal scanner, may be interconnected to bus 202 through user interface adapter 210. A display device 213 may be coupled to bus 202 through display adapter 211. In this manner, a user may be capable of inputting to terminal 103 through keyboard 212 and receiving output from terminal 103 via display device 213. Biometric device 214 may be used to authenticate the user at terminal 103 thereby establishing that the user is authorized to access that particular terminal 103. It is noted that there are numerous types of input devices and display devices known to those skilled in the art and thus need not be described in detail herein.

Implementations of the invention include implementations as a terminal programmed to execute the method or methods described herein, and as a computer program product. According to the terminal implementation, sets of instructions for executing the method or methods may be resident in the random access memory 206 of one or more terminal systems configured generally as described above. Until required by the terminal, the set of instructions may be stored as a computer program product in another memory, for example, in storage medium 209 (which may include a removable memory such as an optical disk or floppy disk for eventual use in the storage medium 209). Further, the computer program product may also be stored at another computer such as another terminal 103 or intermediate server 102 or main server 101 and transmitted when desired to the user's terminal 103 by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change.

Figure 4:
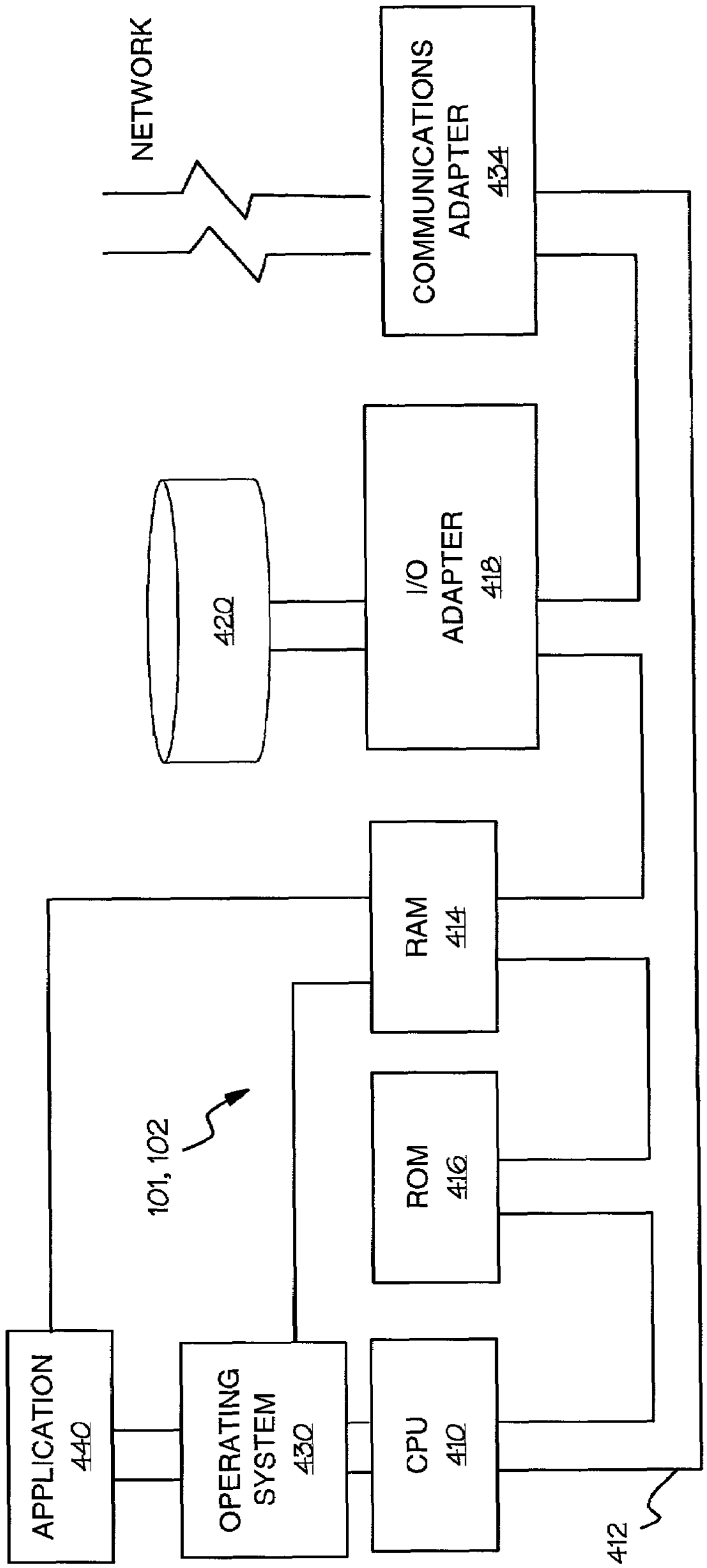
FIG. 4 illustrates an embodiment of the present invention of a server in an enterprise network.

FIG. 4—Hardware Configuration of Servers

FIG. 4 illustrates an embodiment of the present invention of main server 101, intermediate server 102. Referring to FIG. 4, main server 101, intermediate server 102 may comprise a central processing unit (CPU) 410 coupled to various other components by system bus 412. An operating system 430 runs on CPU 410 and provides control and coordinates the function of the various components of FIG. 4. An application 440 in accordance with the principles of the present invention may run in conjunction with operating system 430 and provide calls to operating system 430 where the calls implement the various functions or services to be performed by application 440. An application 440 of main server 101 may include, for example, a program for updating authentications 302, e.g., passwords, authentication numbers, within boot code image 301, i.e., binary executable boot code, stored in ROM 205 at terminal 103 from a remote central site as described in the description of FIG. 5, a program for storing authentications 302, e.g., passwords, authentication numbers, within boot code image 301 stored in ROM 205 at terminal 103 from a remote central site as described in FIG. 6. Read only memory (ROM) 416 may be coupled to system bus 412 and include a basic input/output system ("BIOS") that controls certain basic functions of main server 101, intermediate server 102. Random access memory (RAM) 414, disk adapter 418 and communications adapter 434 may also be coupled to system bus 412. It should be noted that software components including operating system 430 and application 440 may be loaded into RAM 414 which is the computer system's main memory. Disk adapter 418 may be a small computer system interface ("SCSI") adapter that communicates with disk units 420, e.g., disk drive. It is noted that the program of the present invention that updates authentications 302, e.g., passwords, authentication numbers, within boot code image 301, i.e., binary executable boot code, stored in ROM 205 at terminal 103 from a remote central site as described in the description of FIG. 5, may reside in disk unit 420 or application 440. It is further noted that the program of the present invention that stores authentications 302, e.g., passwords, authentication numbers, within boot code image 301, i.e., binary executable boot code, stored in ROM 205 at terminal 103 from a remote central site as described in the description of FIG. 6, may reside in disk unit 420 or application 440. Communications adapter 434 interconnects bus 412 with an outside network enabling main server 101, intermediate server 102 to communicate with terminal 103 via a Local Area Network (LAN), e.g., Ethernet, Token Ring, ARCnet, or a Wide Area Network (WAN), e.g., Internet.

Implementations of the invention include implementations as a computer system programmed to execute the method or methods described herein, and as a computer program product. According to the computer system implementations, sets of instructions for executing the method or methods are resident in the random access memory 414 of one or more computer systems configured generally as described above. Until required by main server 101, intermediate server 102, the set of instructions may be stored as a computer program product in another computer memory, for example, in disk drive 420 (which may include a removable memory such as an optical disk or floppy disk for eventual use in disk drive 420). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 5:
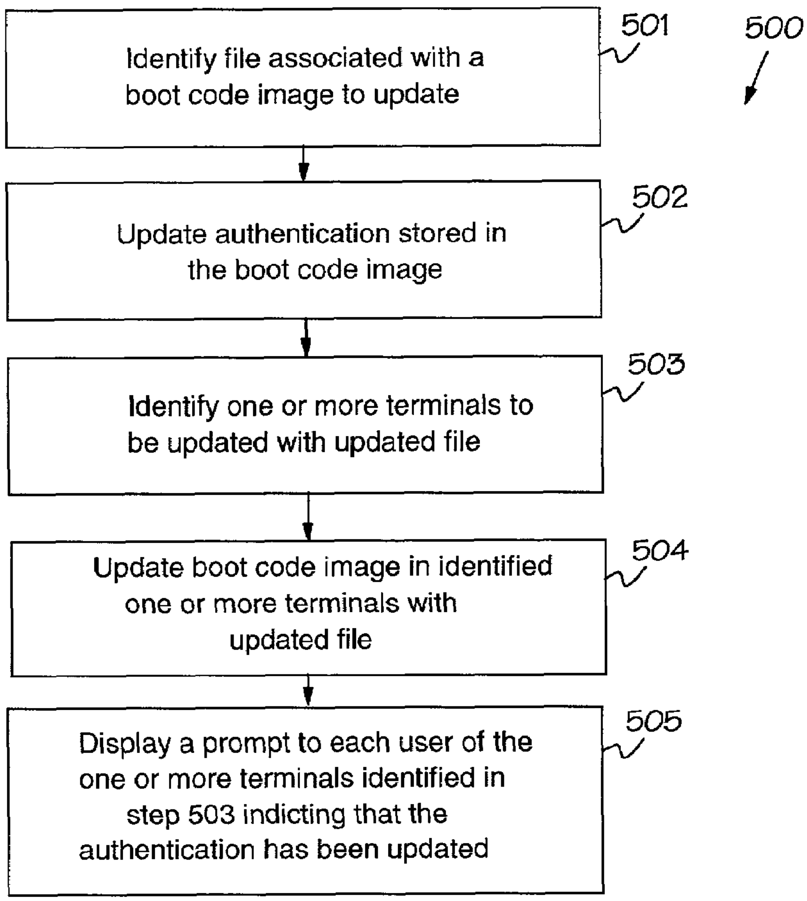
FIG. 5 is a flowchart of a method for updating authentications within a boot code image in a terminal from a central site.

FIG. 5—Method for Updating Authentications within a Boot Code Image Stored in ROM in a Terminal from a Remote Central Site FIG. 5 is a flowchart of one embodiment of the present invention of a method 500 for updating authentications 302, e.g., passwords, authentication numbers, within boot code image 301, i.e., binary executable boot code such as BIOS binary executable code, stored in ROM, e.g., flash ROM, at terminal 103 from a remote central site. As stated in the Background Information section, passwords such as passwords to protect unauthorized users from booting the system and accessing setup options are typically stored in non-volatile Random Access Memory (RAM) in the terminal. By storing passwords in non-volatile RAM, a user at a terminal may be able to change or modify the password which may not be desirable. Users may accidentally or maliciously change the password which may result in disastrous consequences such as not being able to boot up the terminal if the user cannot remember the new password. Furthermore, if the user at the terminal forgets the new password, the system administrative staff at the central site, e.g., headquarters, may have difficulty assisting the user as they may not know the new password since the user and not the system administrators at the central site changed the password. Furthermore, in an enterprise network environment, it may be difficult, cumbersome and time consuming to update passwords stored in terminals as each terminal may have different passwords from which to update which may not be known by the system administrators. It would therefore be desirable to store authentications, e.g., password to protect unauthorized users from booting the system, password to protect unauthorized users from accessing setup options, an authentication number to permit installation of software, an authentication to permit operation of software, within a boot code image, i.e., binary executable boot code, stored in ROM, e.g., flash ROM, at a terminal, e.g., cash register, personal computer, thereby preventing the user at the terminal from tampering authentications. It would further be desirable to update the authentications stored in the boot code image in each terminal from a central site, e.g., headquarters, thereby allowing system administrators the ability to know the current authentication installed at the terminal. Method 500 is a method for addressing the above concerns.

In step 501, a file associated with boot code image 301 (FIG. 3), i.e., binary executable boot code such as BIOS binary executable code, to be updated in one or more terminals 103 (FIG. 2) may be identified at a central site geographically separate from the location of the one or more terminals 103 to be updated as described below. As stated above, each terminal 103 coupled to main server 101 may comprise a boot code image 301. A portion of boot code image 301 may be allocated for storing authentication 302, e.g., password to protect unauthorized users from booting the system, password to protect unauthorized users from accessing setup options, an authentication number to permit installation of software, an authentication to permit operation of software. In order to update authentication 302 in one or more terminals 103 coupled to main server 101, a file associated with boot code image 301 to be updated in the one or more terminals 103 may be identified at a central site in step 501.

In step 502, authentication 302, e.g., password to protect unauthorized users from booting the system, password to protect unauthorized users from accessing setup options, authentication number to permit installation of software, an authentication to permit operation of software, in boot code image 301 in the file identified in step 501 may be updated. In one embodiment, authentication 302 in the file associated with boot code image 103 identified in step 501 may be updated without recompiling the entire file associated with boot code image 103. That is, the bytes in the file associated boot code image 103 storing authentication 302 may be modified without modifying any other bytes of the file.

In step 503, one or more terminals 103 coupled to main server 101 may be identified as storing an authentication 302 in their boot code image 301 that needs to be updated.

In step 504, authentication 302 in boot code image 301 in each of the one or more terminals 103 identified in step 503 may be updated with authentication 302 updated in step 502. In one embodiment, the updated file may be downloaded from main server 101 to each of the one or more terminals 103 identified in step 503 via a network, e.g., LAN, WAN. In one embodiment, the entire boot code image 301 stored in ROM 205 (FIG. 2), e.g., flash ROM, in each of the one or more terminals 103 identified in step 503 may be updated. In another embodiment, a utility program may be attached to the updated file that erases and writes to selected portions of boot code image 301 stored in ROM 205, e.g., flash ROM, such as the portion storing authentication 302. Subsequently, the portion storing authentication 302 in boot code image 301 stored in ROM 205 in each of the one or more terminals 103 identified in step 503 may be erased and written with the updated authentication 302. In another embodiment, the updated file may be stored on a storage medium, e.g., magnetic disk, compact disc, which may then be loaded onto the one or more terminals 103 identified in step 503. In one embodiment, the entire boot code image 301 stored in ROM 205 (FIG. 2), e.g., flash ROM, in each of the one or more terminals 103 identified in step 503 may be updated. In another embodiment, a utility program may be attached to the updated file that erases and writes to selected portions of boot code image 301 stored in ROM 205 such as the portion storing authentication 302 thereby installing the updated authentication 302.

In step 505, a prompt may be displayed to each user of the one or more terminals 103 identified in step 503 indicating that authentication 302 has been updated. In one embodiment, boot code image 301 may comprise code to indicate to the user of terminal 103 that authentication 302 has been updated upon updating authentication 302. For example, authentication 302 in boot code image 301 may be updated during the evening when terminal 103 is deactivated. When the user of terminal 103 activates terminal 103, the user may receive a prompt indicating that authentication 302, e.g., password, has been updated and to enter the new authentication 302, e.g., password. Upon the user receiving the new authentication 302 from a person in authority, the user may enter the new authentication 302 thereby allowing the user to boot the system or to access setup options or to install software, etc.

By storing authentication 302 in boot code image 301 in ROM 205, e.g., flash ROM, in each terminal 103, e.g., cash register, personal computer, in an enterprise network environment, a user at terminal 103 may be prevented from tampering authentication 302. Furthermore, by updating authentication 302 stored in boot code image 301 from a remote central site, e.g., headquarters, system administrators at the central site may have knowledge of the current authentication installed at terminal 103.

It is noted that method 500 may be executed in a different order presented and that the order presented in the discussion of FIG. 5 is illustrative. It is further noted that certain steps may be executed almost concurrently. It is further noted that steps 501–504 may be implemented by a program in main server 101 residing in application 440 (FIG. 4) or disk unit 420 (FIG. 4).

Figure 6:
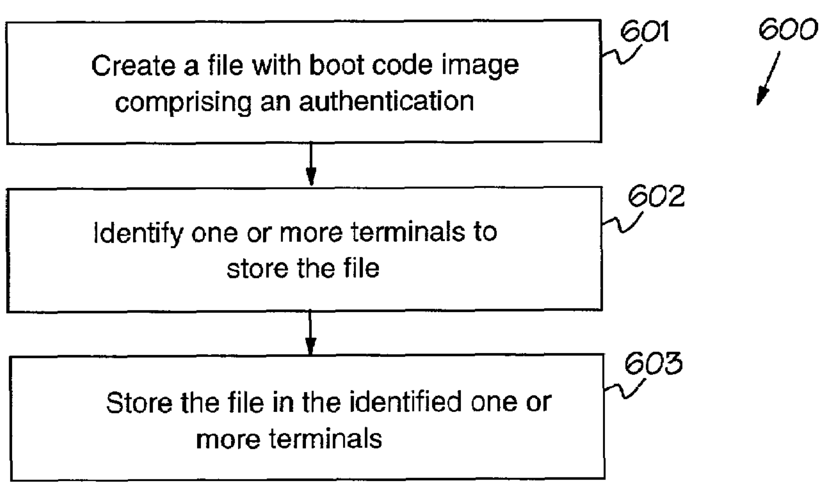
FIG. 6 is a flowchart of a method for storing authentications in the boot code image in a terminal from a central site.

FIG. 6—Method for Storing Authentications within a Boot Code Image Stored in ROM in a Terminal from a Remote Central Site FIG. 6 is a flowchart of one embodiment of the present invention of a method 600 for storing authentications 302, e.g., authentication number to install software, within boot code image 301, i.e., binary executable boot code such as BIOS binary executable code, stored in ROM 205 at terminal 103 from a remote central site.

In step 601, a file may be created comprising a boot code image 301 (FIG. 3), i.e., binary executable boot code, where boot code image 301 may comprise an authentication 302, e.g., authentication number to install software. The file may be created at a central site geographically separate from the location of one or more terminals 103 to receive the file as described below.

In step 602, one or more terminals 103 coupled to main server 101 may be identified to store the file created in step 601.

In step 603, the file may be saved in ROM 205 (FIG. 2), e.g., flash ROM, in the one or more terminals 103 identified in step 602. In one embodiment, the file may be downloaded from main server 101 to each of the one or more terminals 103 identified in step 602 via a network, e.g., LAN, WAN. In another embodiment, the file may be stored on a storage medium, e.g., magnetic disk, compact disc, which may then be loaded onto the one or more terminals 103 identified in step 602.

It is noted that method 600 may be executed in a different order presented and that the order presented in the discussion of FIG. 6 is illustrative. It is further noted that certain steps may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for updating authentications in terminals from a central site comprising the steps of:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first password and said second authentication comprises a second password.

2. A method for updating authentications in terminals from a central site comprising the steps of:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first authentication number and said second authentication comprises a second authentication number used to permit operation of software.

3. A computer program product embodied in a machine readable medium for updating authentications in terminals from a central site comprising the programming steps of:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first password and said second authentication comprises a second password.

4. A computer program product embodied in a machine readable medium for updating authentications in terminals from a central site comprising the programming steps of:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first authentication number and said second authentication comprises a second authentication number used to permit operation of software.

5. A system, comprising:

a processor; and a memory unit coupled to said processor, wherein said memory unit stores a computer program, wherein the computer program is executed to perform the following programming steps:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said binary executable boot code in each of said one or more identified terminals is updated via a network.

6. A system, comprising:

a processor; and a memory unit coupled to said processor, wherein said memory unit stores a computer program, wherein the computer program is executed to perform the following programming steps:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said binary executable boot code in each of said one or more identified terminals is updated via a storage medium.

7. A system, comprising:

a processor; and a memory unit coupled to said processor, wherein said memory unit stores a computer program, wherein the computer program is executed to perform the following programming steps:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first password and said second authentication comprises a second password.

8. A system, comprising:

a processor; and a memory unit coupled to said processor, wherein said memory unit stores a computer program, wherein the computer program is executed to perform the following programming steps:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said first authentication comprises a first authentication number and said second authentication comprises a second authentication number used to permit operation of software.

9. A system, comprising:

a processor; and a memory unit coupled to said processor, wherein said memory unit stores a computer program, wherein the computer program is executed to perform the following programming steps:

identifying a file associated with a binary executable boot code to update, wherein said binary executable boot code in said file comprises a first authentication;

updating said first authentication in said binary executable boot code in said file to become a second authentication;

identifying one or more terminals to be updated with said updated file, wherein each of said one or more terminals comprises a read only memory configured to store said binary executable boot code comprising said first authentication; and updating said binary executable boot code in each of said one or more identified terminals with said updated file, wherein, upon updating said binary executable boot code in each of said one or more identified terminals with said updated file, each of said one or more identified terminals stores said binary executable boot code comprising said second authentication in said read only memory;

wherein said binary executable boot code is Basic Input/Output System binary executable code.

10. A system, comprising:

a processor; and a memory unit coupled to said processor, wherein said memory unit is operable for storing a computer program, wherein the computer program is operable for performing the following programming steps:

creating a file comprising a binary executable boot code, wherein said binary executable boot code in said file comprises an authentication;

identifying one or more terminals to store said file, wherein each of said one or more terminals comprises a read only memory; and storing said file in said read only memory in each of said identified one or more terminals, wherein each of said one or more identified terminals stores said binary executable boot code comprising said authentication in said read only memory;

wherein said authentication is an authentication number used to permit installation of software.

* * * * *